United States Patent
Zhu et al.

(10) Patent No.: US 10,187,243 B2
(45) Date of Patent: Jan. 22, 2019

(54) PREAMBLE SEQUENCE GENERATING METHOD, TIMING SYNCHRONIZATION METHOD, AND DEVICE

(71) Applicant: Huawei Technologies Co., Ltd., Shenzhen (CN)

(72) Inventors: Wei Zhu, Shenzhen (CN); Yunbao Zeng, Shenzhen (CN); Hui Zhao, Beijing (CN); Long Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 15/165,583

(22) Filed: May 26, 2016

(65) Prior Publication Data

US 2016/0277230 A1    Sep. 22, 2016

Related U.S. Application Data

(63) Continuation of application No. PCT/CN2014/090319, filed on Nov. 5, 2014.

(30) Foreign Application Priority Data

Nov. 27, 2013 (CN) .......................... 2013 1 0616599

(51) Int. Cl.
*G01R 31/08* (2006.01)
*H04L 27/26* (2006.01)
(Continued)

(52) U.S. Cl.
CPC .......... *H04L 27/2692* (2013.01); *H04B 3/54* (2013.01); *H04L 5/22* (2013.01); *H04L 27/2613* (2013.01);
(Continued)

(58) Field of Classification Search
CPC .................................................. H04L 27/2692
See application file for complete search history.

(56) References Cited

U.S. PATENT DOCUMENTS

| | | | |
|---|---|---|---|
| 7,352,691 B2 | 4/2008 | Hagen et al. | |
| 7,738,355 B1 * | 6/2010 | Goh ...................... | H04L 25/022 370/204 |

(Continued)

FOREIGN PATENT DOCUMENTS

| | | | |
|---|---|---|---|
| CN | 101729485 A | 6/2010 | |
| CN | 101998471 A | 3/2011 | |

(Continued)

OTHER PUBLICATIONS

ITU-T, "Narrowband orthogonal frequency division multiplexing power line communication transceivers—Physical layer specification," International Telecommunication Union, Series G: Transmission Systems and Media, Digital Systems and Networks, Access networks—In premises networks, G.9955 (Dec. 2011), 180 pages.

(Continued)

*Primary Examiner* — Gerald A Smarth
(74) *Attorney, Agent, or Firm* — Slater Matsil, LLP

(57) ABSTRACT

The present invention discloses a preamble sequence generating method and device, which are used to avoid a problem, caused by damages to a preamble sequence resulting from interference in an NB-PLC system, that it is difficult for a receive end to correctly perform timing synchronization. The method includes: determining a quantity m of orthogonal frequency division multiplexing OFDM symbols that constitute a single pattern in a preamble sequence, where m is not less than 2; and generating a preamble sequence according to m, so that every m OFDM symbols that are in the generated preamble sequence and consecutive in a time domain constitute a single pattern, and the generated preamble sequence includes at least two (Continued)

patterns, where the patterns are different from each other. Embodiments of the present invention further provide a timing synchronization method and device.

13 Claims, 5 Drawing Sheets

(51) Int. Cl.
  *H04B 3/54* (2006.01)
  *H04L 5/22* (2006.01)
(52) U.S. Cl.
  CPC ...... *H04L 27/2662* (2013.01); *H04L 27/2688* (2013.01)

(56) References Cited

U.S. PATENT DOCUMENTS

| | | | |
|---|---|---|---|
| 8,964,789 B1* | 2/2015 | Lee | H04L 27/2613 370/503 |
| 9,167,383 B1* | 10/2015 | Barrand | H04W 4/02 |
| 2006/0126490 A1 | 6/2006 | Hagen et al. | |
| 2006/0126491 A1* | 6/2006 | Ro | H04L 27/2647 370/208 |
| 2009/0067540 A1* | 3/2009 | Lee | H04W 74/004 375/296 |
| 2009/0154529 A1* | 6/2009 | Cho | H04L 27/2656 375/137 |
| 2009/0307541 A1 | 12/2009 | Razazian et al. | |
| 2013/0114757 A1* | 5/2013 | Park | H04L 27/2613 375/295 |
| 2013/0272147 A1* | 10/2013 | Vermani | H04B 7/0891 370/252 |
| 2015/0085732 A1 | 3/2015 | Bao et al. | |

FOREIGN PATENT DOCUMENTS

| | | |
|---|---|---|
| CN | 102113260 A | 6/2011 |
| CN | 102932313 A | 2/2013 |
| CN | 103124433 A | 5/2013 |

OTHER PUBLICATIONS

Liang, Y-L., "Research on OFDM Temporary Time Locking of Using FFT," Journal of Nanjing University of Posts and Telecommunications (Natural Science), vol. 29, No. 5, Oct. 2009, 10 pages.
Minn, H., et al., "A Robust Timing and Frequency Synchronization for OFDM Systems," IEEE Transactions on Wireless Communications, vol. 2, No. 4, Jul. 2003, pp. 822-839.

* cited by examiner

PREAMBLE SEQUENCE GENERATING METHOD, TIMING SYNCHRONIZATION METHOD, AND DEVICE

CROSS-REFERENCE TO RELATED APPLICATIONS

This application is a continuation of International Application No. PCT/CN2014/090319, filed on Nov. 5, 2014, which claims priority to Chinese Patent Application No. 201310616599.7, filed on Nov. 27, 2013, both of which are hereby incorporated by reference in their entireties.

TECHNICAL FIELD

The present invention relates to the field of communications technologies, and in particular, to a preamble sequence generating method, a timing synchronization method, and a device.

BACKGROUND

Synchronization is a practical problem that all communications systems need to resolve. Without precise synchronization, reliable data transmission is impossible. Therefore, a synchronization technology is directly related to performance of an entire communications system.

Generally, synchronization is classified into timing synchronization and frequency synchronization. Timing synchronization includes coarse synchronization and fine synchronization, and a purpose is to enable a signal receive end to determine the start time and end time of each symbol. To enable the receive end to accurately find a beginning part of a data symbol sent by a transmit end, a current technical means that is commonly used is to add a preamble sequence (that is, a Preamble, where a symbol included in the Preamble may be referred to as a preamble symbol) before the data symbol to indicate arrival of the data symbol. Because the preamble sequence is known to the receive end, the receive end may perform a correlation calculation between the preamble sequence and a received signal sequence by using the known preamble sequence, to obtain a correlation value that represents a correlation degree between the preamble sequence and the received signal sequence. Specifically, when the receive end receives the preamble sequence, an apparent peak appears in the correlation value obtained by calculation according to the foregoing manner; therefore the receive end may determine that a currently received signal sequence is the preamble sequence and then perform timing synchronization.

Currently, a timing synchronization solution used in a narrow band-power line communication (NB-PLC) system is similar to the foregoing solution, and is also implemented based on the preamble sequence. For example, according to a provision, on a physical frame structure, specified by the International Telecommunications Union (ITU) in the G.hnem physical layer protocol G.9955, timing synchronization may be performed for a signal at the receive end by using a preamble sequence shown in FIG. 1.

The preamble sequence shown in FIG. 1 mainly includes preamble symbol S1 and preamble symbol S2, where S1 consists of eight orthogonal frequency division multiplexing (OFDM) symbols that carry same information. If S is used to represent a single OFDM symbol included in S1, S1 may be represented as: S1={S, S, S, S, S, S, S, S}; S2 includes only one OFDM symbol that is denoted as −S, that is, S2={−S}. In FIG. 1, a main purpose of using multiple consecutive OFDM symbols to repeatedly carry same information is to resist a bad channel condition in the NB-PLC system, so as to improve a probability of correctly receiving a preamble symbol by the receive end, thereby improving a synchronization rate of the NB-PLC system.

In practical application, when a receive end needs to determine a beginning part of a data symbol sent by a transmit end, delay autocorrelation may first be performed on a received signal sequence, that is, a delay correlation value of a pair of OFDM symbols that are consecutively received is calculated, where a length of the pair of OFDM symbols is a length of the signal sequence, and when a quantity of delay correlation values determined within a time period are more than a set quantity of correlation values, it is determined that a preamble symbol arrives, that is, a coarse synchronization process is completed. Further, the receive end performs sliding correlation between a locally prestored symbol S and signal sequences received after the coarse synchronization process is completed; and when a negative peak appears in correlation values, obtained by calculation, between the locally prestored symbol S and the received signal sequences, it is determined that S2 is detected, and therefore a timing synchronization point may be determined, that is, a fine synchronization process is completed.

Currently, the NB-PLC system mainly works in a frequency band of 3-500 kHz, and a channel of the NB-PLC system mainly includes a slowly-changing multipath, colored noise, narrowband interference, pulse interference, periodic noise whose frequency is synchronous with an industrial frequency, and periodic noise whose frequency is asynchronous with the industrial frequency. The periodic noise whose frequency is synchronous with the industrial frequency and the periodic noise whose frequency is asynchronous with the industrial frequency may be classified into frequency-domain narrowband interference and time-domain burst pulse interference. In a low band channel of the NB-PLC system, the frequency-domain narrowband interference is extremely severe. In addition, time-domain burst pulse interference that is generated because of non-standard electrical equipment in a power line and whose intensity is 10-15 dB higher than background noise also makes a channel condition of the NB-PLC system extremely bad.

Existence of the foregoing interference makes the preamble sequence shown in FIG. 1 vulnerable to damages. For example, S2 in FIG. 1 is extremely easy to be flooded by the burst pulse interference, thereby making it difficult to complete timing synchronization.

SUMMARY

Embodiments of the present invention provide a preamble sequence generating method and device, which are used to avoid a problem, caused by damages to a preamble sequence resulting from interference in an NB-PLC system, that it is difficult for a receive end to correctly perform timing synchronization.

The embodiments of the present invention further provide a timing synchronization method and device.

The embodiments of the present invention use the following technical solutions:

According to a first aspect, a preamble sequence generating method is provided, including: determining a quantity m of orthogonal frequency division multiplexing OFDM symbols that constitute a single pattern in a preamble sequence, where m is not less than 2; and generating a preamble sequence according to m, so that every m OFDM symbols that are in the generated preamble sequence and consecutive in a time domain constitute a single pattern, and the generated preamble sequence includes at least two patterns, where the patterns are different from each other.

With reference to the first aspect, in a first possible implementation manner, the method further includes: determining, according to correlation values between a preamble symbol stored in a receive end and preamble symbols included in the generated preamble sequence, a pattern identifier for each pattern included in the generated preamble sequence.

With reference to the first aspect or the first possible implementation manner of the first aspect, in a second possible implementation manner, m is determined by using the following manner: determining m according to a prestipulated quantity of OFDM symbols that constitute the generated preamble sequence and a preset mapping relationship between the quantity and m.

With reference to the second possible implementation manner of the first aspect, in a third possible implementation manner, the preset mapping relationship includes:

$$2^m - 2 \geq L - m + 1$$

where L is the prestipulated quantity of OFDM symbols that constitute the generated preamble sequence.

According to a second aspect, a timing synchronization method is provided, including: receiving, by a receive end, a signal sequence, where a time domain length of the signal sequence is an integral multiple of a time domain length of a single orthogonal frequency division multiplexing OFDM symbol, and is not less than a time domain length of a stipulated quantity of OFDM symbols; separately determining, by the receive end, correlation values between all signal subsequences that can be included in the signal sequence and a stored single OFDM symbol used as a preamble symbol, where signal points included in the signal subsequence are multiple signal points that are consecutive in a time domain, and a quantity of signal points included in the signal sequence is the same as a quantity N of signal points included in the stored single OFDM symbol; sequentially selecting without repetition, by the receive end, according to the determined correlation values and according to ordering, in a time domain, of all the signal subsequences that can be included in the signal sequence, determined correlation values to generate correlation value sets until the determined correlation values are all selected, where a quantity of correlation values included in each of the correlation value sets are equal to N; determining, by the receive end, a correlation value with a largest modulus value in each correlation value set; when it is determined that m correlation values that jointly meet a stipulated condition exist in determined correlation values with largest modulus values in the correlation value sets, generating, by the receive end, a pattern identifier according to the m correlation values and a preset pattern identifier generating manner, where that the m correlation values jointly meet the stipulated condition specifically includes the following: after the m correlation values are sorted according to an order that the signal subsequences are received, an interval between sorting positions, in all the signal subsequences that can be included in the signal sequence, of signal subsequences respectively corresponding to two adjacent correlation values in the m correlation values is N; and when the generated pattern identifier is the same as one of pattern identifiers that are predetermined according to the generating manner for patterns that are included in the preamble sequence, determining, by the receive end, a start position of the preamble sequence according to a position, in the preamble sequence, of a pattern indicated by the generated pattern identifier.

With reference to the second aspect, in a first possible implementation manner of the aspect, the generating, by the receive end, a pattern identifier according to the m correlation values and a preset pattern identifier generating manner, specifically includes: determining, by the receive end according to the m correlation values and a preset decimal number generating manner, a decimal number used as the generated pattern identifier.

According to a third aspect, a preamble sequence generating device is provided, including: a quantity determining unit, configured to determine a quantity m of orthogonal frequency division multiplexing OFDM symbols that constitute a single pattern in a preamble sequence, where m is not less than 2; and a preamble sequence generating unit, configured to generate a preamble sequence according to m determined by the quantity determining unit, so that every m OFDM symbols that are in the generated preamble sequence and consecutive in a time domain constitute a single pattern, and the generated preamble sequence includes at least two patterns, where the patterns are different from each other.

With reference to the third aspect, in a first possible implementation manner, the device further includes an identifier determining unit, configured to determine, according to correlation values between a preamble symbol stored in a receive end and preamble symbols included in the generated preamble sequence, a pattern identifier for each pattern included in the generated preamble sequence.

With reference to the third aspect or the first possible implementation manner of the first aspect, in a second possible implementation manner, the quantity determining unit determines m by using the following manner:

determining m according to a prestipulated quantity of OFDM symbols that constitute the generated preamble sequence and a preset mapping relationship between the quantity and m.

With reference to the second possible implementation manner of the third aspect, in a third possible implementation manner, the preset mapping relationship includes:

$$2^m - 2 \geq L - m + 1$$

where L is the prestipulated quantity of OFDM symbols that constitute the generated preamble sequence.

According to a fourth aspect, a receive end device is provided, including: a signal sequence receiving unit, configured to receive a signal sequence, where a time domain length of the signal sequence is an integral multiple of a time domain length of a single orthogonal frequency division multiplexing OFDM symbol, and is not less than a time domain length of a stipulated quantity of OFDM symbols. A first correlation value determining unit is configured to separately determine correlation values between all signal subsequences that can be included in the signal sequence and a stored single OFDM symbol used as a preamble symbol, where signal points included in the signal subsequence are multiple signal points that are consecutive in a time domain, and a quantity of signal points included in the signal subsequence is the same as a quantity N of signal points included in the stored single OFDM symbol. A correlation value selecting unit is configured to sequentially select without repetition, according to the determined correlation values and according to ordering, in the time domain, of all the signal subsequences that can be included in the signal sequence, determined correlation values to generate correlation value sets until the determined correlation values are all selected, where a quantity of correlation values included in each correlation value set is equal to N. A second correlation value determining unit is configured to determine a correlation value with a largest modulus value in each correlation value set. A pattern identifier generating unit is configured to: when it is determined that m correlation values that jointly meet a stipulated condition exist in determined correlation values with largest modulus values in the correlation value sets, generate a pattern identifier according to the m correlation values and a preset pattern identifier generating manner, where that the m correlation values jointly meet the stipulated condition specifically includes the following: after the m correlation values are sorted according to an order that the signal subsequences are received, an interval between sorting positions, in all the signal subsequences that can be included in the signal sequence, of signal subsequences respectively corresponding to two adjacent correlation values in the m correlation values is N. A start position determining unit is configured to: when the generated pattern identifier is the same as one of pattern identifiers that are predetermined according to the generating manner for patterns that are included in the preamble sequence, determine a start position of the preamble sequence according to a position, in the preamble sequence, of a pattern indicated by the generated pattern identifier.

With reference to the fourth aspect, in a first possible implementation manner, the pattern identifier generating unit is specifically configured to determine, according to the m correlation values and a preset decimal number generating manner, a decimal number used as the generated pattern identifier.

Beneficial effects of the embodiments of the present invention are as follows. In the embodiments of the present invention, every m OFDM symbols that are in a generated preamble sequence and consecutive in a time domain may constitute a single pattern, and the preamble sequence includes at least two patterns, where the patterns are different from each other, thereby greatly improving damage resistance of the preamble sequence and avoiding a problem, caused by damages to the preamble sequence resulting from interference in an NB-PLC system, that it is difficult for a receive end to correctly identify a start position of the preamble sequence and that it is difficult to correctly perform timing synchronization. Specifically, that the damage resistance of the preamble sequence is greatly improved is shown as follows: every m OFDM symbols may jointly constitute a pattern, and all patterns are different from each other, so that identifiability of the preamble sequence is improved, and even though a preamble symbol is damaged due to interference, it can still be ensured that a complete pattern may exist in the preamble sequence so that the preamble sequence can be correctly identified.

DETAILED DESCRIPTION OF ILLUSTRATIVE EMBODIMENTS

In order to avoid a problem, caused by damages to a preamble sequence resulting from interference in an NB-PLC system, that it is difficult for a receive end to correctly identify a start position of the preamble sequence, embodiments of the present invention first provide a preamble sequence generating method.

The following describes the embodiments of the present invention with reference to the drawings accompanying the specification. It should be understood that the embodiments described herein are merely used to describe and explain the present invention, but are not intended to limit the present invention. The embodiments of the present invention and features in the embodiments may be combined in a case in which they do not conflict with each other.

Figure 1:
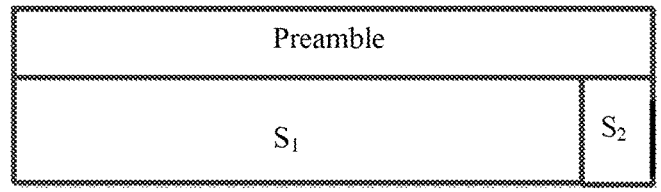
FIG. 1 is a schematic diagram of a preamble sequence that is stipulated in the G.9955 to be used for performing timing synchronization.
Figure 2:
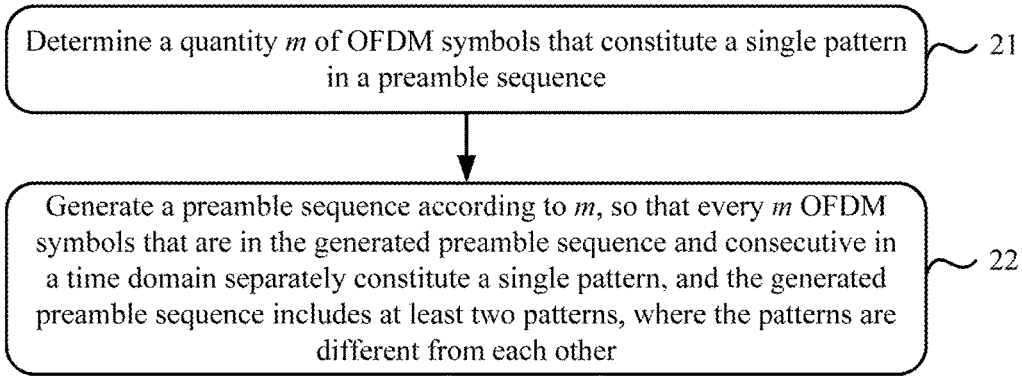
FIG. 2 is a schematic flowchart of implementing a preamble sequence generating method according to an embodiment of the present invention.

FIG. 2 shows a specific schematic flowchart of a preamble sequence generating method according to an embodiment of the present invention, and the method mainly includes following steps:

Step 21: Determine a quantity m of orthogonal frequency division multiplexing OFDM symbols that constitute a single pattern in a preamble sequence, where m is not less than 2, and "pattern" refers to a symbol sequence that is in a preamble sequence and constituted by at least two OFDM symbols.

For example, m may be determined according to a prestipulated quantity of OFDM symbols that constitute a generated preamble sequence and a preset mapping relationship between the quantity and m.

Specifically, the preset mapping relationship may be but is not limited to following formula [1]:

$$2^m - 2 \geq L - m + 1$$

where L is the prestipulated quantity of OFDM symbols that constitute the generated preamble sequence.

Step 22: Generate a preamble sequence according to m, so that every m OFDM symbols that are in the generated preamble sequence and consecutive in a time domain constitute a single pattern, and the generated preamble sequence includes at least two patterns, where the patterns are different from each other.

The foregoing method provided in this embodiment of the present invention may further include the following step: determine, according to correlation values between a preamble symbol stored in a receive end and preamble symbols included in the generated preamble sequence, a pattern identifier for each pattern included in the generated preamble sequence. The pattern identifier generating manner used in the embodiment of the present invention will be described in detail, and details are not provided here.

Figure 3:
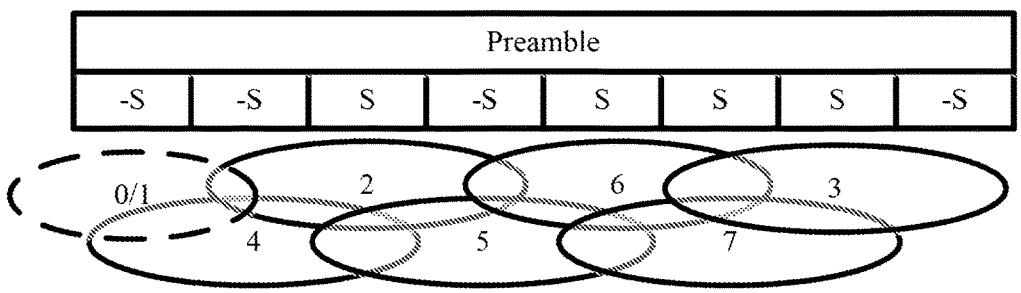
FIG. 3 is a schematic diagram of a generated preamble sequence according to an embodiment of the present invention.

By using the preamble sequence generating method provided in this embodiment of the present invention, for example, when the prestipulated quantity of OFDM symbols that constitute the generated preamble sequence is 8, it may be obtained by calculation that m may be equal to 3. When m=3, a preamble sequence generated by performing step 22 is shown in FIG. 3. The preamble sequence shown in FIG. 3 may totally include six patterns different from each other, where pattern identifiers of the patterns may be numbers, which are respectively 2 to 7, in ellipses shown in FIG. 3. Any ellipse in FIG. 3 satisfies that a pattern identifier of a pattern that corresponds to the ellipse and is in the preamble sequence is a number in the ellipse. For example, if a pattern corresponding to an ellipse that includes a number "2" is {−S, S, −S}, a pattern identifier of the pattern is 2.

It should be noted that the first two OFDM symbols in the preamble sequence shown in FIG. 3 and a noise signal that is one OFDM symbol in length and appears before the preamble sequence may jointly constitute a "pseudo pattern" that is similar to a pattern included in the preamble sequence, and existence of the "pseudo pattern" may cause that the receive end mistakenly identifies the "pseudo pattern" as a pattern in the preamble sequence. Therefore, in this embodiment of the present invention, another identifier different from the foregoing pattern identifiers 2 to 7 may be allocated to the pseudo pattern. Considering that the noise signal that appears before the first OFDM symbol in the preamble sequence may be S, or may be −S, in this embodiment of the present invention, pattern identifier 0 or 1 may be allocated to the "pseudo pattern" that is constituted by the first two OFDM symbols in the preamble sequence shown in FIG. 3. For example, a pattern identifier allocated to a pseudo pattern {−S, −S, −S} may be 0, and an identifier allocated to a pseudo pattern {S, −S, −S} may be 1; and the other way round.

In this embodiment of the present invention, every m OFDM symbols that are in a preamble sequence and consecutive in a time domain may constitute a single pattern, and the preamble sequence includes at least two patterns, where the patterns are different from each other, thereby greatly improving damage resistance of the preamble sequence, and avoiding a problem, caused by damages to the preamble sequence resulting from interference in an NB-PLC system, that it is difficult for a receive end to correctly identify a start position of the preamble sequence and that it is difficult to correctly perform timing synchronization. Specifically, that the damage resistance of the preamble sequence is greatly improved is shown as follows: every m OFDM symbols may jointly constitute a pattern, and all patterns are different from each other, so that identifiability of the preamble sequence is improved, and even though a preamble symbol is damaged due to interference, it can still be ensured that a complete pattern may exist in the preamble sequence so that the preamble sequence can be correctly identified.

Figure 4:
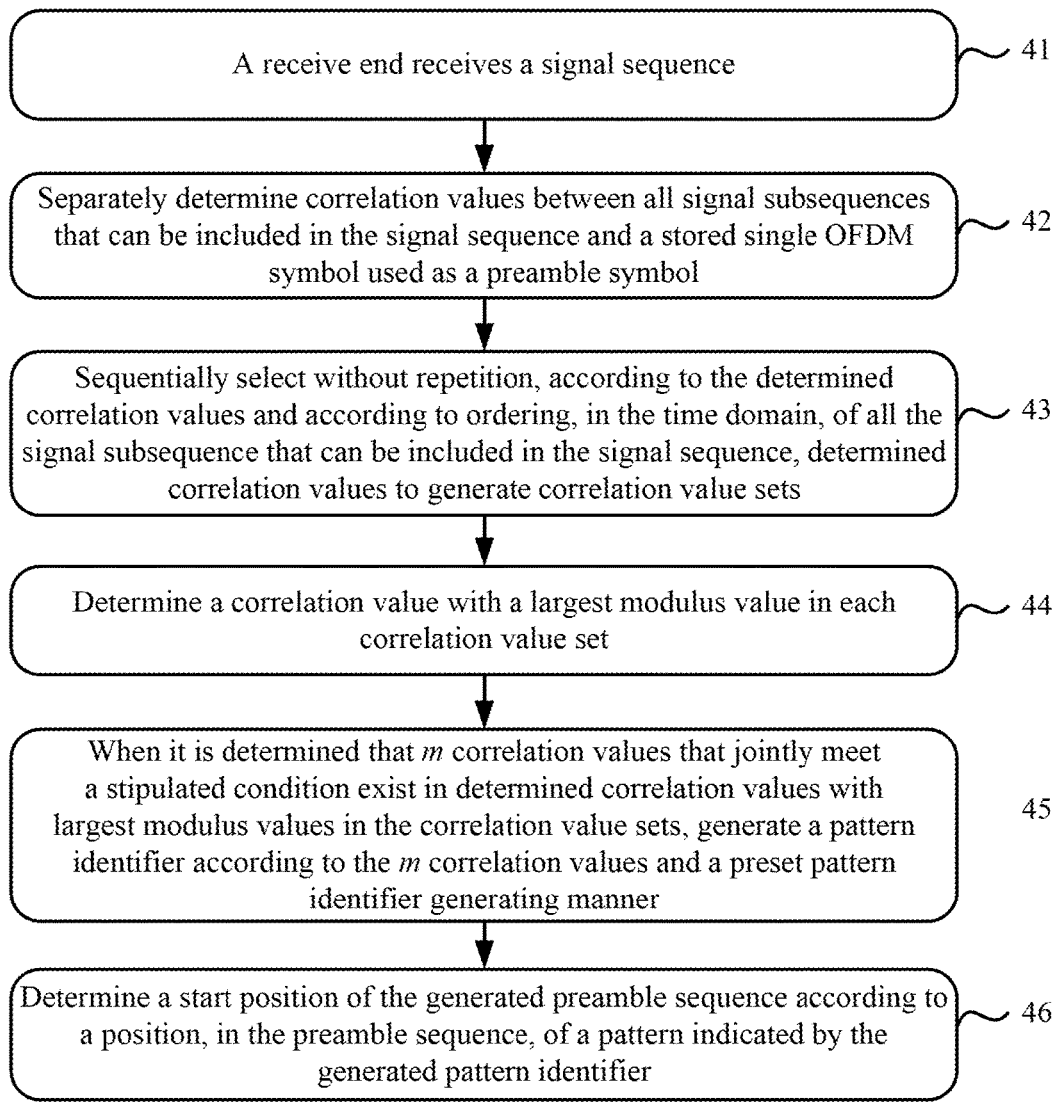
FIG. 4 is a schematic flowchart of implementing a timing synchronization method according to an embodiment of the present invention.

Based on the same invention conception as the preamble sequence generating method, an embodiment of the present invention further provides a timing synchronization method. A schematic flowchart of specific implementation of the method is shown in FIG. 4, and the method mainly includes following steps:

Step 41: A receive end receives a signal sequence.

A time domain length of the signal sequence is an integral multiple of a time domain length of a single OFDM symbol, and is not less than a time domain length of a stipulated quantity of OFDM symbols.

The stipulated quantity herein is not less than m+1, and m is a predetermined quantity of orthogonal frequency division multiplexing OFDM symbols that constitute a single pattern in a preamble sequence, where "pattern" refers to a symbol sequence that is in a preamble sequence and constituted by at least two OFDM symbols.

In this embodiment of the present invention, the preamble sequence includes at least two patterns, and the patterns included in the preamble sequence are different from each other. For example, FIG. 3 shows a schematic diagram of a preamble sequence used in this embodiment of the present invention. In FIG. 3, if it is assumed that m=3, the preamble sequence may totally include six patterns different from each other, and pattern identifiers of the patterns may be numbers, which are respectively 2 to 7, in ellipses shown in FIG. 3. Any ellipse in FIG. 3 satisfies that a pattern identifier of a pattern that corresponds to the ellipse and is in the preamble sequence is a number in the ellipse. For example, if a pattern corresponding to an ellipse that includes a number "2" is {−S, S, −S}, a pattern identifier of the pattern is 2.

It should be noted that the first two OFDM symbols in the preamble sequence shown in FIG. 3 and a noise signal that is one OFDM symbol in length and appears before the preamble sequence may jointly constitute a "pseudo pattern" that is similar to a pattern included in the preamble sequence, and existence of the "pseudo pattern" may cause that the receive end mistakenly identifies the "pseudo pattern" as a pattern in the preamble sequence. Therefore, in this embodiment of the present invention, another identifier different from the foregoing pattern identifiers 2 to 7 may be allocated to the pseudo pattern. Considering that the noise signal that appears before the first OFDM symbol in the preamble sequence may be S, or may be −S, in this embodiment of the present invention, pattern identifier 0 or 1 may be allocated to the "pseudo pattern" that is constituted by the first two OFDM symbols in the preamble sequence shown in FIG. 3. For example, a pattern identifier allocated to a pseudo pattern {−S, −S, −S} may be 0, and an identifier allocated to a pseudo pattern {S, −S, −S} may be 1; and the other way round.

In this embodiment of the present invention, a determining manner of m may be shown in formula [1].

For example, in FIG. 3, if a quantity L of OFDM symbols that constitute the preamble sequence is 8, according to formula [1], it may be obtained by calculation that m≥3.

Step 42: Separately determine correlation values between all signal subsequences that can be included in the signal sequence and a stored single OFDM symbol used as a preamble symbol.

Signal points included in the signal subsequence are multiple signal points that are consecutive in a time domain, and a quantity of signal points included in the signal subsequence is the same as a quantity N of signal points included in the stored single OFDM symbol used as the preamble symbol.

Step 43: Sequentially select without repetition, according to the determined correlation values and according to ordering, in the time domain, of all the signal subsequences that can be included in the signal sequence, determined correlation values to generate correlation value sets until the determined correlation values are all selected.

A quantity of correlation values included in each of the foregoing correlation value sets is equal to N.

Step 44: Determine a correlation value with a largest modulus value in each correlation value set.

Step 45: When it is determined that m correlation values that jointly meet a stipulated condition exist in determined correlation values with largest modulus values in the correlation value sets, generate a pattern identifier according to the m correlation values and a preset pattern identifier generating manner.

In this embodiment of the present invention, that the m correlation values jointly meet the stipulated condition specifically includes the following: after the m correlation values are sorted according to an order that the signal subsequences are received, an interval between sorting positions, in all the signal subsequences that can be included in the signal sequence, of signal subsequences respectively corresponding to two adjacent correlation values in the m correlation values is N.

The preset pattern identifier generating manner used in the embodiment of the present invention will be described in detail, and details are not provided here.

Step 46: When the pattern identifier generated by performing step 45 is the same as one of pattern identifiers that are predetermined according to the preset pattern identifier generating manner for patterns that are included in the preamble sequence, determine a start position of the preamble sequence according to a position, in the preamble sequence, of a pattern indicated by the generated pattern identifier, so as to implement timing synchronization according to the start position.

For example, in FIG. 3, when a pattern identifier generated by performing step 45 is "6", it may be determined that m signal subsequences corresponding to the m correlation values correspond to a pattern {−S, S, S} in the preamble sequence. It can be learned, from a position of the pattern {−S, S, S} in the preamble sequence shown in FIG. 3, that the second OFDM symbol that is consecutively received after the m signal subsequences is the end position of the preamble sequence. However, when a pattern identifier generated by performing step 45 is "0", it can be learned, according to the fact that the pattern identifier is different from a pattern identifier of a pattern included in the preamble sequence but is the same as the pattern identifier of the "pseudo pattern", that the m signal subsequences included in the received signal sequence do not belong to the preamble sequence, and therefore the procedure can be ended, or the procedure may continue to determine whether other m correlation values that jointly meet the foregoing stipulated condition exist in the correlation values corresponding to the signal subsequences that can be included in the signal sequence, or the procedure may continue to receive another signal sequence, and determine whether m correlation values that jointly meet the foregoing stipulated condition exist in correlation values corresponding to signal subsequences that can be included in the another signal sequence that is subsequently received.

The following example is used to describe how step 43 to step 45 are implemented.

If it is assumed that m=3, and that the time domain length of the signal sequence is equal to a time domain length of four OFDM symbols, and if it is further assumed that all the determined correlation values are denoted as $\{\rho_1, \rho_2, \rho_3, \ldots, \rho_{3N}\}$, three correlation value sets may be generated according to step 43, which are respectively $\{\rho_1, \rho_2, \rho_3, \ldots, \rho_N\}$, $\{\rho_{N+1}, \rho_{N+2}, \rho_{N+3}, \ldots, \rho_{2N}\}$, and $\{\rho_{2N+1}, \rho_{2N+2}, \rho_{2N+3}, \ldots, \rho_{3N}\}$.

Further, correlation values with largest modulus values in the correlation value sets $\{\rho_1, \rho_2, \rho_3, \ldots, \rho_N\}$, $\{\rho_{N+1}, \rho_{N+2}, \rho_{N+3}, \ldots, \rho_{2N}\}$, and $\{\rho_{2N+1}, \rho_{2N+2}, \rho_{2N+3}, \ldots, \rho_{3N}\}$ may be separately determined. For example, the correlation values with largest modulus values that are determined from the three correlation value sets are respectively $\rho_{\lambda_1}$, $\rho_{\lambda_2}$, and $\rho_{\lambda_3}$. A value range of $\lambda_1$ is [1, N], a value range of $\lambda_2$ is [N+1, 2N], and a value range of $\lambda_3$ is [2N+1, 3N].

Then, it is determined whether $\lambda_1$, $\lambda_2$, and $\lambda_3$ meet the following: $\lambda_3-\lambda_2=N$, and $\lambda_2-\lambda_1=N$. If a result of the determining is yes, the pattern identifier may be generated according to the m correlation values and the preset pattern identifier generating manner; And if a result of the determining is no, the procedure may be ended, or similar processing may be further performed, according to the timing synchronization method provided in this embodiment of the present invention, on another signal sequence subsequently received after the signal sequence is received.

It should be noted that, in step 45, a specific implementation manner of generating the pattern identifier according to the m correlation values and the preset pattern identifier generating manner may be but is not limited to including: determining, according to the m correlation values and a preset decimal number generating manner, a decimal number used as the generated pattern identifier.

For example, when m=3, the m correlation values may be converted, according to the following formula [2], to a decimal number K used as the generated pattern identifier:

$$K = \frac{\operatorname{sgn}(\rho_{\lambda_1})+1}{2} + 2\frac{\operatorname{sgn}(\rho_{\lambda_2})+1}{2} + 2^2\frac{\operatorname{sgn}(\rho_{\lambda_3})+1}{2} \quad [2]$$

It should be noted that sgn(number) satisfies that, if the number is greater than 0, sgn(number)=1; if the number is equal to 0, sgn(number)=0; and if number is less than 0, sgn(number)=−1, where K may be obtained by calculation according to $\rho_{\lambda_1}$, $\rho_{\lambda_2}$, and $\rho_{\lambda_3}$, and the formula [2]. The m correlation values match a pattern whose pattern identifier is K in the preamble sequence.

It can be learned from the timing synchronization provided in this embodiment of the present invention that, the preamble sequence in this embodiment of the present invention includes at least two patterns, and the patterns included in the preamble sequence are different from each other; therefore even though one of the patterns is damaged due to interference, the preamble sequence can still be identified according to another pattern, and a start position of the preamble sequence can still be correctly located.

Specifically, based on the preamble sequence provided in this embodiment of the present invention, in this embodiment of the present invention, when it is detected that m correlation values that jointly meet a stipulated condition exist, it is determined that m signal subsequences corresponding to the m correlation values match a pattern in the preamble sequence, and a pattern identifier of the pattern matching the m signal subsequences is generated according to a preset pattern identifier generating method, and therefore it can be implemented that a start position of the preamble sequence is determined according to a position, in the preamble sequence, of the pattern indicated by the generated pattern identifier, thereby avoiding a problem, caused by damages to the preamble sequence resulting from interference in an NB-PLC system, that it is difficult for a receive end to correctly identify the end position of the preamble sequence.

With reference to a practical scenario, the following describes in detail a specific implementation manner of the foregoing method, provided in this embodiment of the present invention, in the NB-PLC system in which a factor, such as pulse interference, that greatly affects a channel environment exists.

It should first be noted that in the specific implementation manner, if it is assumed that the preamble sequence includes eight OFDM symbols, it may be determined, according to the formula [1], that m=3, that is, three OFDM symbols constitute one pattern.

According to a principle that the preamble sequence includes patterns different from each other, a preamble sequence shown in FIG. 3 may be obtained by performing permutation and combination on OFDM symbols S and −S that constitute the preamble sequence. The preamble sequence is denoted as P, and then P={−S, −S, +S, −S, +S, +S, +S, −S}. S may be an OFDM symbol that is stipulated in the G.9955 to be used as a preamble symbol.

In this embodiment of the present invention, if it is assumed that a binary number sequence is as follows: $V_b=[V_1, V_2, \ldots, V_8]$, where $V_i=\frac{1}{2}\{sgn[cor(P(i), S)]+1\}$, i=1, 2, ..., 8, and P(i) represents the $i^{th}$ preamble symbol in the preamble sequence P, decimal numbers obtained by converting every three adjacent binary numbers in $V_b$ are different from each other. If it is assumed that $V_d$ represents a decimal number sequence that consists of the decimal numbers obtained by converting every three adjacent binary numbers in $V_b$, $V_d=[4, 2, 5, 6, 7, 3]$ may be obtained by calculation according to an algorithm similar to the formula [2]. The decimal numbers in $V_d$ are pattern identifiers of patterns in the preamble sequence shown in FIG. 3.

Figure 5:
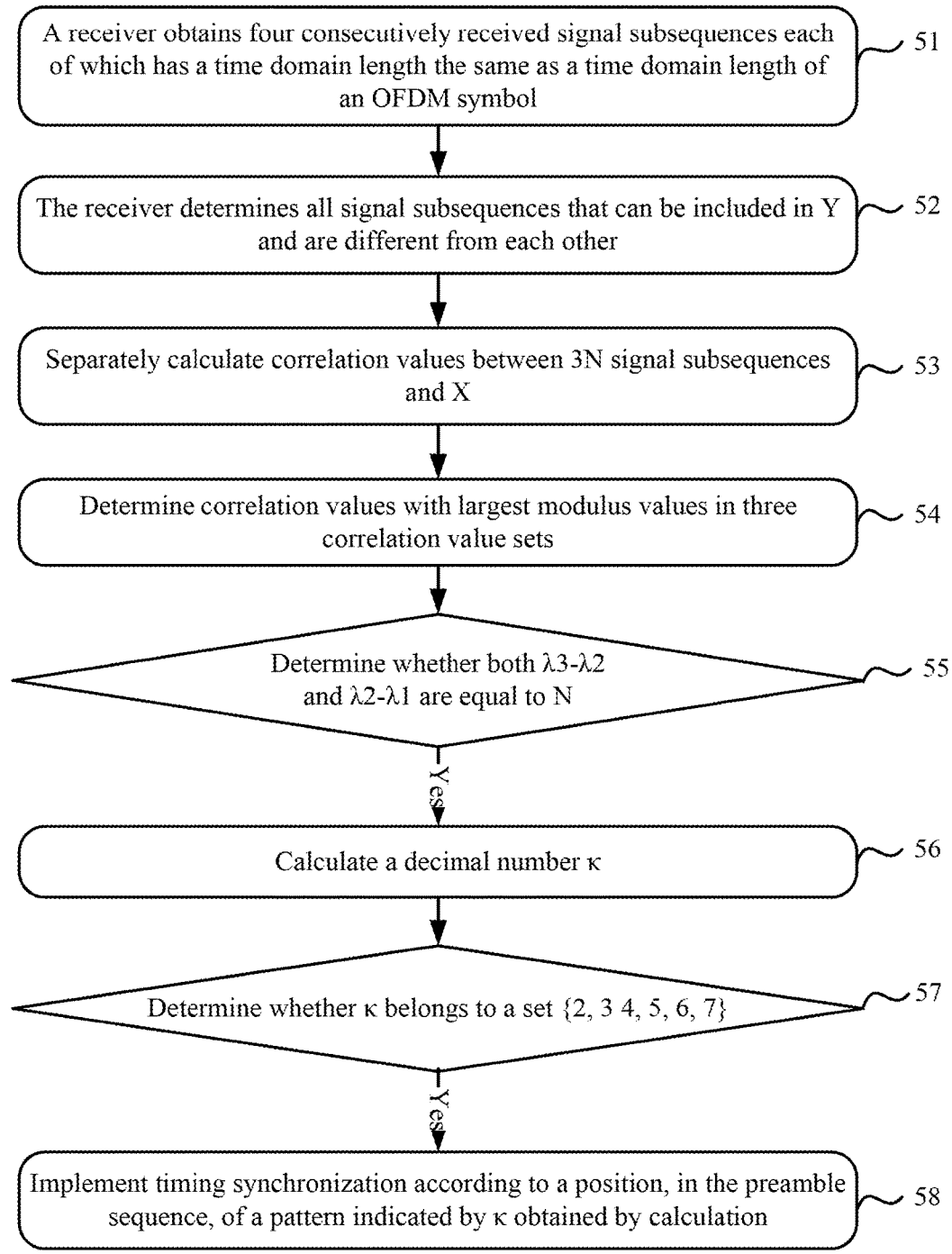
FIG. 5 is a schematic diagram of an implementation manner, in an NB-PLC system, for a solution provided by an embodiment in the present invention.

Based on the preamble sequence shown in FIG. 3, the following describes an implementation procedure of the specific implementation manner. A schematic diagram of the implementation procedure is shown in FIG. 5, and the procedure includes the following steps:

Step 51: A receiver obtains four consecutively received signal subsequences each of which has a time domain length the same as a time domain length of an OFDM symbol.

Because a quantity of signal points included in each signal subsequence is the same as a quantity N of signal points included in an OFDM symbol used as a preamble symbol, if a signal sequence consisting of the foregoing four signal subsequences is denoted as Y, Y={y(1), y(2), y(3), ..., y(4N)}.

A quantity of signal points included in Y is 4N, and if y(q) represents a signal point whose sequence number is q, a value range of q is [1, 4N].

Step 52: The receiver determines all signal subsequences that can be included in Y and are different from each other.

Every determined signal subsequence needs to satisfy that the signal subsequence includes N signal points that are consecutive in a time domain.

For example, signal points in Y may be sequentially selected in a manner of sliding selection of a signal point, to constitute a signal subsequence, so that 3N signal subsequences may be obtained. If $Y_k$ is used to represent the $k^{th}$ signal subsequence, $Y_k=\{y(k), y(k+1), \ldots, y(k+N)\}$, where a value range of k is [1, 3N].

Step 53: The receiver performs sliding correlation between an OFDM symbol X={x(1), x(2), ..., x(N)} that is locally prestored and used as a preamble symbol and $Y_k$ (k∈[1,3N]), that is, separately calculates correlation values between the foregoing 3N signal subsequences and X.

For example, a correlation value $\rho_k$ between X and $Y_k$ may be calculated by using the following formula [3]:

$$\rho_k = cor(X, Y_k) = \frac{X^H Y_k}{\|X\|_2 \|Y_k\|_2} \quad k=1, 2, \ldots, 3N \qquad [3]$$

Step 54: Equally divide a sequence $\{\rho_1, \rho_2, \rho_3, \ldots, \rho_{3N}\}$ constituted by the obtained correlation values into three sets constituted by correlation values, that is $\{\rho_1, \rho_2, \rho_3, \ldots, \rho_N\}$, $\{\rho_{N+1}, \rho_{N+2}, \rho_{N+3}, \ldots, \rho_{2N}\}$, and $\{\rho_{2N+1}, \rho_{2N+2}, \rho_{2N+3}, \ldots, \rho_{3N}\}$, and then separately determine correlation values with largest modulus values in the three correlation value sets. If it is assumed that $\lambda_1$ represents a sequence number of a correlation value with a largest modulus value in the first correlation value set $\{\rho_1, \rho_2, \rho_3, \ldots \rho_N\}$, $\lambda_2$ represents a sequence number of a correlation value with a largest modulus value in the second correlation value set $\{\rho_{N+1}, \rho_{N+2}, P_{N+3}, \ldots, \rho_{2N}\}$, and $\lambda_3$ represents a sequence number of a correlation value with a largest modulus value in the third correlation value set $\{\rho_{2N+1}, \rho_{2N+2}, \rho_{2N+3}, \ldots, \rho_{3N}\}$, the following formulas [4] to [6] hold true:

$$\lambda_1 = \arg\max |\{\rho_1, \rho_2, \ldots, \rho_N\}| \qquad [4]$$

$$\lambda_2 = \arg\max |\{\rho_{N+1}, \rho_{N+2}, \ldots, \rho_{2N}\}| \qquad [5]$$

$$\lambda_3 = \arg\max |\{\rho_{2N+1}, \rho_{2N+2}, \ldots, \rho_{3N}\}| \qquad [6]$$

Step 55: Determine whether both $\lambda_3-\lambda_2$ and $\lambda_2-\lambda_1$ are equal to a quantity N of signal points included in the OFDM symbol used as the preamble symbol, and if a result of the determining is yes, perform step 56; otherwise, delete the first x signal points in the signal sequence Y, and add x signal points originally located behind the signal sequence Y into Y, that is, regenerate a new signal sequence Y that includes 4N signal points, and perform step 52 and a subsequent corresponding step on the new signal sequence Y, where x refers to a granularity for performing sliding sampling on a signal point, and when x is smaller, accuracy in locating the preamble sequence is higher, but accordingly, a longer time is required.

Step 56: Substitute $\rho_{\lambda_1}$, $\rho_{\lambda_2}$, and $\rho_{\lambda_3}$ into the following formula, and calculate a decimal number K.

$$K = \frac{sgn(\rho_{\lambda_1})+1}{2} + 2\frac{sgn(\rho_{\lambda_2})+1}{2} + 2^2\frac{sgn(\rho_{\lambda_3})+1}{2}$$

Step 57: Determine whether K obtained by calculation belongs to a set {2, 3, 4, 5, 6, 7}, and if a result of the determining is yes, perform step 58; otherwise, delete the first x signal points in the signal sequence Y, and add x signal points originally located after the signal sequence Y into Y, that is, regenerate a new signal sequence Y that includes 4N signal points, and perform step 52 and a subsequent corresponding step on the new signal sequence Y.

Step 58: Implement timing synchronization according to a position, in the preamble sequence shown in FIG. 3, of a pattern represented by K obtained by calculation, and end a procedure.

It is proved that the foregoing specific implementation manner may bring the following beneficial effects:

First, because timing synchronization may be completed as long as the receive end detects that OFDM symbol correlation in one pattern is not damaged, and compared with the design of a conventional preamble sequence, a channel damage resistance capability is greatly enhanced. Second, a threshold that is set for coarse synchronization is not required, and timing synchronization may be completed by only using a correlation value interval detecting method and a pattern identifier matching method, and therefore a synchronization rate of a system may be improved. Third, because the receive end performs timing synchronization by using the correlation value interval detecting method pattern identifier matching method, in a case in which channel quality is relatively good, timing synchronization may be completed earlier when the first several OFDM symbols are received, so that the time of timing synchronization is shortened, and a delay is reduced. Finally, the design of the preamble sequence provided in this embodiment of the present invention has good extensibility, and the preamble sequence may be applied not only in a channel environment in which a factor such as pulse interference exists, but also in other communication environments.

Figure 6:
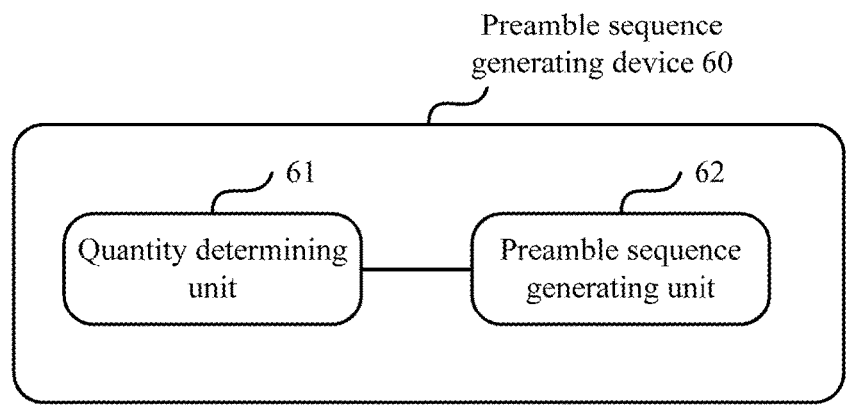
FIG. 6 is a schematic structural diagram of a preamble sequence generating device according to an embodiment of the present invention.

Based on an invention conception the same as that of the preamble sequence generating method provided in the embodiments of the present invention, an embodiment of the present invention further provides a preamble sequence generating device 60. A specific schematic structural diagram of the preamble sequence generating device 60 is shown in FIG. 6, including a quantity determining unit 61 and a preamble sequence generating unit 62. Functions of the units are described as follows:

The quantity determining unit 61 is configured to determine a quantity m of orthogonal frequency division multiplexing OFDM symbols that constitute a single pattern in a preamble sequence, where m is not less than 2.

The preamble sequence generating unit 62 is configured to generate a preamble sequence according to m determined by the quantity determining unit 61, so that every m OFDM symbols that are in the generated preamble sequence and consecutive in a time domain constitute a single pattern, and the generated preamble sequence includes at least two patterns, where the patterns are different from each other.

Optionally, the preamble sequence generating device 60 provided in this embodiment of the present invention may further include: an identifier determining unit, configured to determine, according to correlation values between a preamble symbol stored in a receive end and preamble symbols included in the generated preamble sequence, a pattern identifier for each pattern included in the generated preamble sequence.

Optionally, the quantity determining unit 61 may specifically determine m by using the following manner: determining m according to a prestipulated quantity of OFDM symbols that constitute the generated preamble sequence and a preset mapping relationship between the quantity and m.

Optionally, the foregoing preset mapping relationship may be but is not limited to including:

$$2^m - 2 \geq L - m + 1$$

where L is the prestipulated quantity of OFDM symbols that constitute the generated preamble sequence.

In this embodiment of the present invention, every m OFDM symbols that are in a generated preamble sequence and consecutive in a time domain may constitute a single pattern, and the preamble sequence includes at least two patterns, where the patterns are different from each other, thereby greatly improving damage resistance of the preamble sequence and avoiding a problem, caused by damages to the preamble sequence resulting from interference in an NB-PLC system, that it is difficult for a receive end to correctly identify a start position of the preamble sequence and that it is difficult to correctly perform timing synchronization. Specifically, that the damage resistance of the preamble sequence is greatly improved is shown as follows: every m OFDM symbols may jointly constitute a pattern, and all patterns are different from each other, so that identifiability of the preamble sequence is improved, and even though a preamble symbol is damaged due to interference, it can still be ensured that a complete pattern may exist in the preamble sequence so that the preamble sequence can be correctly identified.

Figure 7:
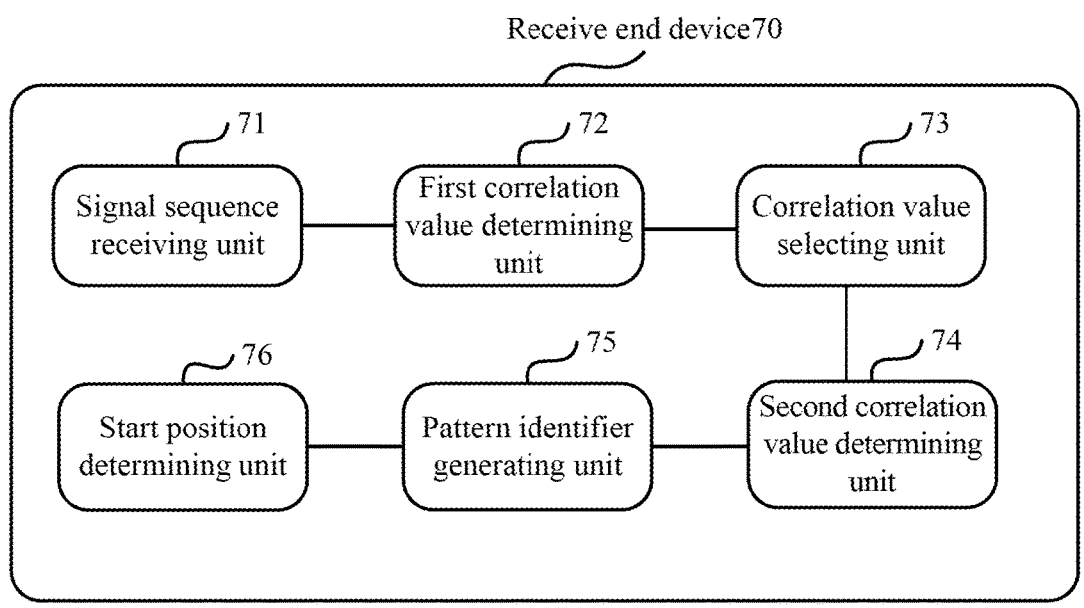
FIG. 7 is a schematic structural diagram of a receive end device according to an embodiment of the present invention.

Based on an invention conception the same as that of the timing synchronization method provided in the embodiments of the present invention, an embodiment of the present invention further provides a receive end device 70. A specific schematic structural diagram of the receive end device 70 is shown in FIG. 7, and the device includes the following functional units:

A signal sequence receiving unit 71 is configured to receive a signal sequence, where a time domain length of the signal sequence is an integral multiple of a time domain length of a single orthogonal frequency division multiplexing OFDM symbol and is not less than a time domain length of a stipulated quantity of OFDM symbols.

A first correlation value determining unit 72 is configured to separately determine correlation values between all signal subsequences that can be included in the signal sequence and a stored single OFDM symbol used as a preamble symbol, where signal points included in the signal subsequence are multiple signal points that are consecutive in a time domain, and a quantity of signal points included in the signal subsequence is the same as a quantity N of signal points included in the stored single OFDM symbol.

A correlation value selecting unit 73 is configured to sequentially select without repetition, according to the determined correlation values and according to ordering, in the time domain, of all the signal subsequences that can be included in the signal sequence, determined correlation values to generate correlation value sets until the determined correlation values are all selected, where a quantity of correlation values included in each correlation value set is equal to N.

A second correlation value determining unit 74 is configured to determine a correlation value with a largest modulus value in each correlation value set.

A pattern identifier generating unit 75 is configured to: when it is determined that m correlation values that jointly meet a stipulated condition exist in determined correlation values with largest modulus values in the correlation value sets, generate a pattern identifier according to the m correlation values and a preset pattern identifier generating manner, where that the m correlation values jointly meet the stipulated condition specifically includes the following: after the m correlation values are sorted according to an order that the signal subsequences are received, an interval between sorting positions, in all the signal subsequences that can be included in the signal sequence, of signal subsequences respectively corresponding to two adjacent correlation values in the m correlation values is N.

A start position determining unit 76 is configured to: when the generated pattern identifier is the same as one of pattern identifiers that are predetermined according to the generating manner for patterns that are included in the preamble sequence, determine a start position of the preamble sequence according to a position, in the preamble sequence, of a pattern indicated by the generated pattern identifier.

Optionally, the pattern identifier generating unit 75 is specifically configured to determine, according to the m correlation values and a preset decimal number generating manner, a decimal number used as the generated pattern identifier.

In this embodiment of the present invention, every m OFDM symbols that are in a generated preamble sequence and consecutive in a time domain may constitute a single pattern, and the preamble sequence includes at least two patterns, where the patterns are different from each other, thereby greatly improving damage resistance of the preamble sequence and avoiding a problem, caused by damages to the preamble sequence resulting from interference in an NB-PLC system, that it is difficult for a receive end to correctly identify a start position of the preamble sequence and that it is difficult to correctly perform timing synchronization. Specifically, that the damage resistance of the preamble sequence is greatly improved is shown as follows: every m OFDM symbols may jointly constitute a pattern, and all patterns are different from each other, so that identifiability of the preamble sequence is improved, and even though a preamble symbol is damaged due to interference, it can still be ensured that a complete pattern may exist in the preamble sequence so that the preamble sequence can be correctly identified.

Figure 8:
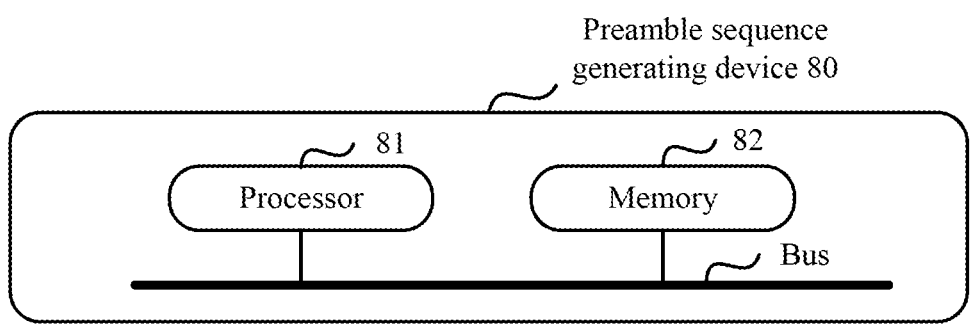
FIG. 8 is a schematic structural diagram of another preamble sequence generating device according to an embodiment of the present invention.

Based on an invention conception the same as that of the preamble sequence generating method provided in the embodiments of the present invention, an embodiment of the present invention further provides a preamble sequence generating device 80, and a specific schematic structural diagram is shown in FIG. 8. The preamble sequence generating device 80 includes: a processor 81, a memory 82, and a bus 83. The processor 81 and the memory 82 are connected by using the bus 83. The memory 82 is configured to store instructions. The processor 81 invokes, by using the bus 83, the instructions stored in the memory 82, and is configured to: determine a quantity m of OFDM symbols that constitute a single pattern in a preamble sequence, where m is not less than 2; and generate a preamble sequence according to m, so that every m OFDM symbols that are in the generated preamble sequence and consecutive in a time domain constitute a single pattern, and the generated preamble sequence includes at least two patterns, where the patterns are different from each other.

Optionally, the processor 81 may be further configured to determine, according to correlation values between a preamble symbol stored in a receive end and preamble symbols included in the generated preamble sequence, a pattern identifier for each pattern included in the generated preamble sequence.

In this embodiment of the present invention, every m OFDM symbols that are in a generated preamble sequence and consecutive in a time domain may constitute a single pattern, and the preamble sequence includes at least two patterns, where the patterns are different from each other, thereby greatly improving damage resistance of the preamble sequence and avoiding a problem, caused by damages to the preamble sequence resulting from interference in an NB-PLC system, that it is difficult for a receive end to correctly identify a start position of the preamble sequence and that it is difficult to correctly perform timing synchronization. Specifically, that the damage resistance of the preamble sequence is greatly improved is shown as follows: every m OFDM symbols may jointly constitute a pattern, and all patterns are different from each other, so that identifiability of the preamble sequence is improved, and even though a preamble symbol is damaged due to interference, it can still be ensured that a complete pattern may exist in the preamble sequence so that the preamble sequence can be correctly identified.

Figure 9:
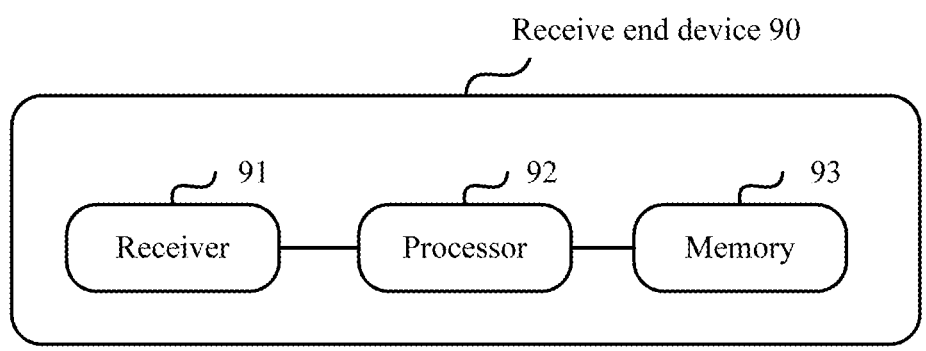
FIG. 9 is a schematic structural diagram of another receive end device according to an embodiment of the present invention.

Based on an invention conception the same as that of the timing synchronization method provided in the embodiments of the present invention, an embodiment of the present invention further provides another receive end device 90, and a specific schematic structural diagram of the device is shown in FIG. 9, including: a receiver 91, a processor 92, and a memory 93. The receiver 91 is configured to receive a signal sequence.

A time domain length of the signal sequence is an integral multiple of a time domain length of a single OFDM symbol, and is not less than a time domain length of a stipulated quantity of OFDM symbols.

The memory 93 is configured to store instructions; and the processor 92, by invoking the instructions stored in the memory 93, is configured to separately determine correlation values between all signal subsequences that can be included in the signal sequence received by the receiver 91 and a stored single OFDM symbol used as a preamble symbol; sequentially select without repetition, according to the determined correlation values and according to ordering, in the time domain, of all the signal subsequences that can be included in the signal sequence, determined correlation values to generate correlation value sets until the determined correlation values are all selected, where a quantity of correlation values included in each correlation value set is equal to N; determine a correlation value with a largest modulus value in each correlation value set; when it is determined that m correlation values that jointly meet a stipulated condition exist in determined correlation values with largest modulus values in the correlation value sets, generate a pattern identifier according to the m correlation values and a preset pattern identifier generating manner; and when the generated pattern identifier is the same as one of pattern identifiers that are predetermined according to the generating manner for patterns that are included in the preamble sequence, determine a start position of the preamble sequence according to a position, in the preamble sequence, of a pattern indicated by the generated pattern identifier.

Signal points included in the signal subsequence are multiple signal points that are consecutive in a time domain, and a quantity of signal points included in the signal subsequence is the same as a quantity N of signal points included in the stored single OFDM symbol used as the preamble symbol.

That the m correlation values jointly meet the stipulated condition specifically includes the following: after the m correlation values are sorted according to an order of receiving a signal subsequence, an interval between sorting positions, in all the signal subsequences that can be included in the signal sequence, of signal subsequences respectively corresponding to two adjacent correlation values in the m correlation values is N.

Optionally, that the processor 92 generates the pattern identifier according to the m correlation values and the preset pattern identifier generating manner may specifically include that: the processor determines, according to the m correlation values and a preset decimal number generating manner, a decimal number used as the generated pattern identifier.

In this embodiment of the present invention, every m OFDM symbols that are in a preamble sequence and consecutive in a time domain may constitute a single pattern, and the preamble sequence includes at least two patterns, where the patterns are different from each other, thereby greatly improving damage resistance of the preamble sequence, and avoiding a problem, caused by damages to the preamble sequence resulting from interference in an NB-PLC system, that it is difficult for a receive end to correctly identify a start position of the preamble sequence and that it is difficult to correctly perform timing synchronization. Specifically, that the damage resistance of the preamble sequence is greatly improved is shown as follows: every m OFDM symbols may jointly constitute a pattern, and all patterns are different from each other, so that identifiability of the preamble sequence is improved, and even though a preamble symbol is damaged due to interference, it can still be ensured that a complete pattern may exist in the preamble sequence so that the preamble sequence can be correctly identified.

In this embodiment of the present invention, every m OFDM symbols that are in a generated preamble sequence and consecutive in a time domain may constitute a single pattern, and the preamble sequence includes at least two patterns, where the patterns are different from each other, thereby greatly improving damage resistance of the preamble sequence and avoiding a problem, caused by damages to the preamble sequence resulting from interference in an NB-PLC system, that it is difficult for a receive end to correctly identify a start position of the preamble sequence and that it is difficult to correctly perform timing synchronization. Specifically, that the damage resistance of the preamble sequence is greatly improved is shown as follows: every m OFDM symbols may jointly constitute a pattern, and all patterns are different from each other, so that identifiability of the preamble sequence is improved, and even though a preamble symbol is damaged due to interference, it can still be ensured that a complete pattern may exist in the preamble sequence so that the preamble sequence can be correctly identified.

It should be understood that in this embodiment of the present invention, the processor may be a central processing unit (CPU), or may be another general-purpose processor, a digital signal processor (DSP), an application-specific integrated circuit (ASIC), a field programmable gate array (FPGA), another programmable logic device, a discrete gate or transistor logic device, a discrete hardware assembly, or the like. A general purpose processor may be a microprocessor or the processor may also be any conventional processor and the like.

The memory may include a read-only memory and a random access memory, and provides an instruction and data to a processing unit. Some memories may further include a non-volatile random access memory. For example, the memory may further store device type information.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the present invention have been described, persons skilled in the art may still make changes and modifications to these embodiments once they have learned the basic inventive concept. Therefore, the following claims are intended to be construed as to cover the exemplary embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalents.

What is claimed is:

1. A preamble sequence generating method for communication, the method comprising:

determining a quantity m of orthogonal frequency division multiplexing OFDM symbols that constitute a single pattern in a preamble sequence, wherein m is not less than 2; and generating a preamble sequence comprising a plurality of single patterns according to m, wherein every m OFDM symbols that are in the generated preamble sequence and consecutive in a time domain constitute a single pattern of the plurality of single patterns in the generated preamble sequence, wherein the generated preamble sequence comprises at least two patterns from the plurality of single patterns, and wherein the patterns are different from each other.

2. The method according to claim 1, wherein the method further comprises:

determining, according to correlation values between a preamble symbol stored in a receive end and preamble symbols comprised in the generated preamble sequence, a pattern identifier for each pattern comprised in the generated preamble sequence.

3. The method according to claim 1, wherein m is determined by using the following manner:
determining m according to a prestipulated quantity of OFDM symbols that constitute the generated preamble sequence and a preset mapping relationship between the quantity and m.

4. The method according to claim 3, wherein the preset mapping relationship comprises:

$$2^m - 2 \geq L - m + 1$$

wherein L is the prestipulated quantity of OFDM symbols that constitute the generated preamble sequence.

5. The method according to claim 1, further comprising transmitting the preamble sequence.

6. A timing synchronization method, comprising:
receiving, by a receive end, a signal sequence, wherein a time domain length of the signal sequence is an integral multiple of a time domain length of a single orthogonal frequency division multiplexing OFDM symbol, and is not less than a time domain length of a stipulated quantity of OFDM symbols;
determining, by the receive end, correlation values between all signal subsequences that can be comprised in the signal sequence and a stored single OFDM symbol used as a preamble symbol, wherein signal points comprised in the signal subsequence are multiple signal points that are consecutive in a time domain, and a quantity of signal points comprised in the signal sequence is the same as a quantity N of signal points comprised in the stored single OFDM symbol;
sequentially selecting without repetition, by the receive end, according to the determined correlation values and according to ordering, in a time domain, of all the signal subsequences that can be comprised in the signal sequence, determined correlation values to generate correlation value sets until the determined correlation values are all selected, wherein a quantity of correlation values comprised in each correlation value set is equal to N;
determining, by the receive end, a correlation value with a largest modulus value in each correlation value set;
when it is determined that m correlation values that jointly meet a stipulated condition exist in determined correlation values with largest modulus values in the correlation value sets, generating, by the receive end, a pattern identifier according to the m correlation values and a preset pattern identifier generating manner, wherein that the m correlation values jointly meet the stipulated condition specifically comprises the following: after the m correlation values are sorted according to an order that the signal subsequences are received, an interval between sorting positions, in all the signal subsequences that can be comprised in the signal sequence, of signal subsequences respectively corresponding to two adjacent correlation values in the m correlation values is N; and
when the generated pattern identifier is the same as one of pattern identifiers that are predetermined according to the generating manner for patterns that are comprised in a preamble sequence, determining, by the receive end, a start position of the preamble sequence according to a position, in the preamble sequence, of a pattern indicated by the generated pattern identifier.

7. The timing synchronization method according to claim 6, wherein the generating, by the receive end, a pattern identifier according to the m correlation values and a preset pattern identifier generating manner specifically comprises:
determining, by the receive end according to the m correlation values and a preset decimal number generating manner, a decimal number used as the generated pattern identifier.

8. A preamble sequence generating device for communication, the device comprising:
a processor;
a memory storing program instructions to be executed in the processor, the program instructions comprising a plurality of units, the plurality of units comprising:
a quantity determining unit, configured to determine a quantity m of orthogonal frequency division multiplexing OFDM symbols that constitute a single pattern in a preamble sequence, wherein m is not less than 2; and
a preamble sequence generating unit, configured to generate a preamble sequence comprising a plurality of single patterns according to m determined by the quantity determining unit, wherein every m OFDM symbols that are in the generated preamble sequence and consecutive in a time domain constitute a single pattern of the plurality of single patterns in the generated preamble sequence, wherein the generated preamble sequence comprises at least two patterns from the plurality of single patterns, and wherein the patterns are different from each other.

9. The device according to claim 8, wherein the device further comprises:
an identifier determining unit, configured to determine, according to correlation values between a preamble symbol stored in a receive end and preamble symbols comprised in the generated preamble sequence, a pattern identifier for each pattern comprised in the generated preamble sequence.

10. The device according to claim 8, wherein the quantity determining unit determines m by using the following manner:
determining m according to a prestipulated quantity of OFDM symbols that constitute the generated preamble sequence and a preset mapping relationship between the quantity and m.

11. The device according to claim 10, wherein the preset mapping relationship comprises:

$$2^m - 2 \geq L - m + 1$$

wherein L is the prestipulated quantity of OFDM symbols that constitute the generated preamble sequence.

12. A receive end device for communication, the device comprising:
a processor;
a memory storing program instructions to be executed in the processor, the program instructions comprising a plurality of units, the plurality of units comprising:
a signal sequence receiving unit, configured to receive a signal sequence, wherein a time domain length of the signal sequence is an integral multiple of a time domain length of a single orthogonal frequency division multiplexing OFDM symbol, and is not less than a time domain length of a stipulated quantity of OFDM symbols;
a first correlation value determining unit, configured to separately determine correlation values between all signal subsequences that can be comprised in the signal sequence and a stored single OFDM symbol used as a preamble symbol, wherein signal points comprised in the signal subsequence are multiple signal points that are consecutive in a time domain, and a quantity of signal points comprised in the signal subsequence is the same as a quantity N of signal points comprised in the stored single OFDM symbol;

a correlation value selecting unit, configured to sequentially select without repetition, according to the determined correlation values and according to ordering, in the time domain, of all the signal subsequences that can be comprised in the signal sequence, determined correlation values to generate correlation value sets until the determined correlation values are all selected, wherein a quantity of correlation values comprised in each correlation value set is equal to N;

a second correlation value determining unit, configured to determine a correlation value with a largest modulus value in each correlation value set;

a pattern identifier generating unit, configured to: when it is determined that m correlation values that jointly meet a stipulated condition exist in the determined correlation values with largest modulus values in the correlation value sets, generate a pattern identifier according to the m correlation values and a preset pattern identifier generating manner, wherein that them correlation values jointly meet the stipulated condition specifically comprises the following: after the m correlation values are sorted according to an order that the signal subsequences are received, an interval between sorting positions, in all the signal subsequences that can be comprised in the signal sequence, of signal subsequences respectively corresponding to two adjacent correlation values in the m correlation values is N; and a start position determining unit, configured to: when the generated pattern identifier is the same as one of pattern identifiers that are predetermined according to the generating manner for patterns that are comprised in a preamble sequence, determine a start position of the preamble sequence according to a position, in the preamble sequence, of a pattern indicated by the generated pattern identifier.

13. The receive end device according to claim 12, wherein the pattern identifier generating unit is configured to:

determine, according to the m correlation values and a preset decimal number generating manner, a decimal number used as the generated pattern identifier.

* * * * *